United States Patent
Inoue et al.

[11] 3,790,782
[45] Feb. 5, 1974

[54] TOPOGRAPHIC RADIOISOTOPE CAMERA HAVING AN ADJUSTABLE COLLIMATOR THEREON

[75] Inventors: Minoru Inoue; Kenji Ishimatsu, both of Tokyo; Hideho Tabuchi, Hachioji-shi, all of Japan

[73] Assignee: Hitachi, Ltd., Tokyo, Japan

[22] Filed: Mar. 21, 1969

[21] Appl. No.: 809,138

[30] Foreign Application Priority Data
Mar. 25, 1968 Japan.............................. 43/18920

[52] U.S. Cl. ............ 250/61.5, 250/71.5 S, 250/105
[51] Int. Cl. ........................ G01n 23/00, H01j 37/00
[58] Field of Search ............... 250/61.5, 71.5 S, 105

[56] References Cited
UNITED STATES PATENTS
3,432,660  3/1969  Anger ............................. 250/71.5

OTHER PUBLICATIONS

"Tomographic Gamma–Ray Scanner with Simultaneous Readout of Several Planes" by H. O. Anger, Publication UCRL–16899, University of California Lawrence Radiation Laboratory, Berkeley, California, May, 1966.

*Primary Examiner*—Archie R. Borchelt
*Attorney, Agent, or Firm*—Craig, Antonelli, Stewart & Hill

[57] ABSTRACT

A radioisotope camera adapted to detect radioisotopes on a particular tomographical plane exclusively with high accuracy and high resolution, comprising a multi-hole parallel collimator formed into a special form and a gamma ray detector coupled to the collimator to be movable with respect to the tomographical plane.

7 Claims, 11 Drawing Figures

INVENTORS
MINORU INOUE
KENJI ISHIMATSU
HIDEHO TABUCHI

BY Craig, Antonelli, Stewart & Hill

ATTORNEYS

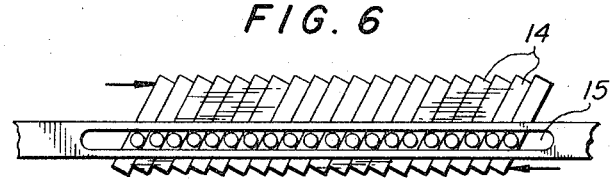
FIG. 6
FIG. 7
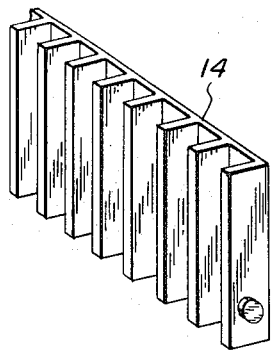
FIG. 8
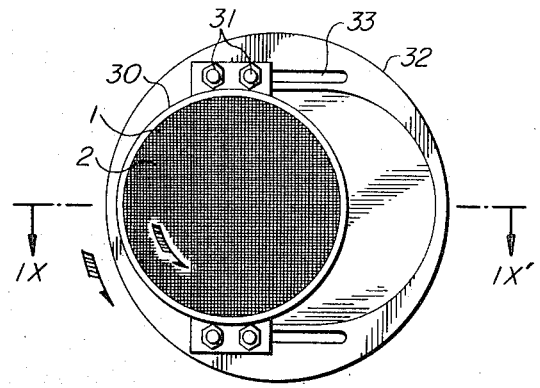
FIG. 9
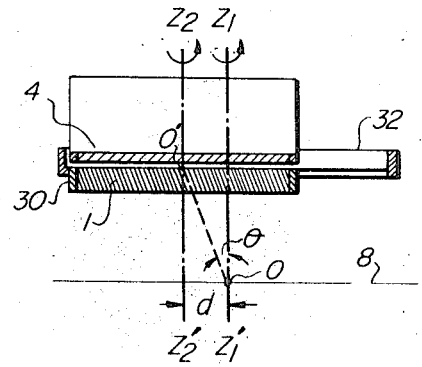

TOPOGRAPHIC RADIOISOTOPE CAMERA HAVING AN ADJUSTABLE COLLIMATOR THEREON

BACKGROUND OF THE INVENTION

1. Field of the Invention

This invention relates to an improvement in a radioisotope camera and more particularly to a radioisotope camera composed to obtain the tomographical information of an object such as a human body, an animal, a plant, a material, a device, etc. with high resolution and good contrast.

2. Description of the Prior Art

A radioisotope camera is used for medical examination using radioisotopes. In such a method of diagnosis, an adequate amount of radioisotope is added to a medicine which tends to be accumulated selectively in a particular organ or diseased part of the human body, when said medicine is given to a patient. Gamma rays emitted from said radioisotope are detected with a radioisotope camera by taking a picture of an object containing a radioisotope distribution, and thus a particular organ or a diseased part in the object can be examined.

The conventional radioisotope camera usually used for such diagnosis has such a structure as described hereinbelow, in which only the total image of an object projected onto a particular plane can be observed. Thus, it has the disadvantage that the diseased part of the object cannot be detected tomographically.

If a radioisotope camera is used in such a method, it becomes quite troublesome to take a tomogram of an object and a long time is needed for diagnosis. Further, it is difficult to diagnose the diseased parts or the like with high accuracy and high resolution.

Thus, Hal O. Anger has proposed to take a tomogram of an object by providing means including collimator holes having such angles that the extensions of center lines of the collimator holes concentrate on one point on a particular tomographical plane and scanning said collimator means and the detector in parallel with said tomographical plane, (University of California, UCRL-16899, May 31, 1966, Tomographic gamma-ray scanner with simultaneous readout of several plants).

The proposed device is a scintillation camera composed of an image detector, a multi-hole focusing collimator placed in front of it and a special optical readout camera.

The operation of said device is fully described in the reference cited above and thus it is not explained here.

This device has an advantage that the tomograms of more than four parts can be obtained simultaneously, but the photographing time becomes longer because scanning similar to the one in an ordinary scintillation-scanner is needed.

Further, it suffers from a disadvantage in that the accuracy of synchronization for the scanning of the detector and the film influences the resolution of the image.

SUMMARY OF THE INVENTION

A primary object of this invention is to provide a radioisotope camera adapted to observe and/or photograph or diagnose an object tomographically.

Another object of this invention is to provide a radioisotope camera capable of detecting or diagnosing an arbitrary tomographic part with high accuracy and high resolution, by simple operations.

A further object of this invention is to show every possibility to achieve said objects. Further, the method of achieving said objects must be simple.

Other objects, features and advantages of this invention will become more apparent from the following detailed disclosure of this invention taken in conjunction with the accompanying drawings.

BRIEF DESCRIPTION OF THE DRAWINGS

FIGS. 5 through 7 show embodiments of a multi-hole type collimator wherein the direction of collimator holes can be freely varied, among which FIG. 5 is a longitudinal sectional diagram, FIG. 6 shows an oblique view of another embodiment and FIG. 7 shows a comb-like metal wafer composing the collimator shown in FIG. 6, FIGS. 8 and 9 show the second embodiment of this invention, in which FIG. 8 shows a plan view and FIG. 9 shows a sectional side view.

DESCRIPTION OF THE PREFERRED EMBODIMENTS

There are radioisotope cameras of various types. The term "radioisotope camera" used here is defined as one which comprises, at least, a gamma-ray detector, a multi-hole type collimator provided in the vicinity of the object side of said gamma-ray detector and a device capable of displaying the distribution of the gamma-ray source (radioisotope) in an object by the signal generated by said gamma-ray detector. This definition will be understood from the description hereinbelow.

Among such radioisotope cameras, much attention has been paid to a scintillation camera because of its high accuracy. Thus, a scintillation camera will be explained as an example of the radioisotope camera.

Typical articles which describe the scintillation camera are the following:

1. U.S. Pat. No. 3,011,057, Nov. 28, 1961, Radiation Image Device, Hal O. Anger.
2. IEEE Transactions on Nuclear Science, Vol. NS-13, No. 3, 1966, Sensitivity, Resolution and Linearity of the Scintillation Camera, by Hal O. Anger.

For the understanding of the typical recent scintillation cameras, said reference (2) is particularly advisable, and the outline thereof will be described hereinafter.

Figure 1:
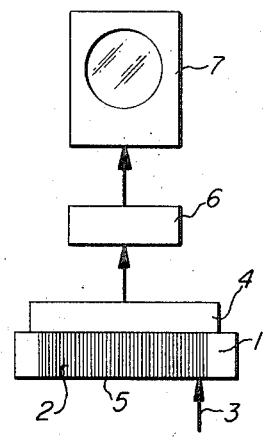
FIG. 1 is a diagram for explaining the principle of a conventional scintillation camera which is a kind of radioisotope camera.

FIG. 1 is a diagram which explains the principle of diagnosis using a typical conventional scintillation camera, wherein reference numeral 1 designates a multi-hole collimator having innumerable holes 2 in a flat plate of a material such as lead alloy, tungsten, etc. through which a gamma-ray hardly penetrates and which is arranged to transmit only gamma-rays 3 coming along the center axes of the small holes. Reference numeral 4 indicates a gamma-ray detector (scintillator)

provided in contact with the collimator. Among the gamma-rays radiated from a diseased part, etc. onto the object side 5 of the collimator 1, only those gamma-rays 3 which are parallel to the center axes of the holes of the collimator (called hereinafter the collimator hole) pass through the collimator holes 2 and reach the detector 4.

The excitation of the detector 4 has the same distribution as that of the gamma-ray sources in the object. In said cited reference (2), said detector is composed of scintillation crystals or scintillators (usually made of a sodium iodide crystal) and phototubes, the light signal (scintillation) emitted with an intensity corresponding to the quantum energy of the gamma-ray is converted into an electric signal by phototubes, said electric signal is sent to a computing circuit 6, an electric signal proportional to the coordinates representing the scintillating position in the detector is generated in the circuit 6 and said signal is displayed in a visible form by a display means 7 such as an oscilloscope, or said image is photographed with a camera. The details of computation in said computing circuit are described in said cited reference and thus they are not explained here.

In the conventional scintillation camera, since only such gamma-rays as those which are parallel to the center axes of the collimator holes reach the detector 4, it is impossible to know from what points on said center axes the gamma rays are radiated. Therefore, it is only possible to know the projectional position of the object by the scintillation camera. In other words, it is impossible to decide from what depth of the object the gamma rays are radiated. Accordingly, it is impossible to tomographically examine a particular organ of a patient.

In order to achieve said object of this invention, a collimator wherein the center axes of collimator holes are mutually parallel is placed in the vicinity of a gamma ray detector on the object side. Then said detector is moved without rotation, keeping the direction of the detector fixed and maintaining the gamma ray sensitive area parallel to a particular tomographical plane. Such a motion is referred to as translation hereinafter. By "varying (or deflecting) the angle of the center axes of collimator holes with respect to the normal of said tomographical plane (collimator angle explained hereinafter) and/or rotating the collimator with said angle kept constant (said axes is not parallel with said normal)" in accompany with the translation of the detector, the detector is made not to detect gamma rays emitted from points except a point corresponding to a point on a detection surface (gamma ray sensitive area) of said detector (hereinafter "on the detector" means "on the gamma ray sensitive area of the detector") and to photograph, record or observe the distribution of the isotopes (gamma ray sources) on the tomographic plane through the signal detected by the detector in a manner similar to the conventional radio-isotope camera.

Figure 2:
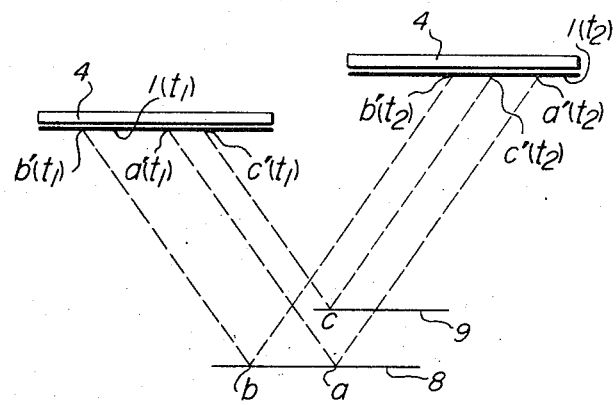
FIGS. 2 and 3 are diagrams for explaining the principle of this invention.

FIG. 2 is a diagram explaining the principle of this invention, wherein 8 indicates the tomographic plane to be diagnosed and 9 indicates a tomographic plane not to be diagnosed. Reference numeral 1 designates the collimator provided in contact with the irrotatable detector 4 whose direction is fixed. The collimator 1 makes a translation together with said detector from a position 1 ($t_1$) at time $t_1$ to a position 1 ($t_2$) at time $t_2$ and the direction of the axis of said collimator hole is changed so that fixed points on said plane correspond one to one to fixed points on the detector.

Then, as shown in FIG. 2, points $a'$ and $b'$ on the detector which correspond to gamma ray sources $a$ and $b$ on the tomographic plane 8 may always maintain a constant relationship equal to that of points $a$ and $b$ on the tomographic plane 8 and keep constant positions with respect to the detector irrespective of time. Accordingly, the image which appears on a display 7 due to a gamma ray source on the plane 8 is kept at a fixed position without translation on the display surface.

On the other hand, as for the gamma ray radiated from an arbitrary gamma ray source $c$ on a tomographic plane 9 other than the plane 8, since the center axis of the collimator hole passing through the point $c$ is parallel to the straight line $\overline{aa'}$, the point on the detector which is $c'(t_1)$ at time $t_1$ becomes a point $c'_2(t_2)$ at time $t_2$, and said point $c'$ moves on the detector as seen from FIG. 2 and the position is not fixed constant unlike said points $a'$ and $b'$.

Accordingly, even when a gamma ray is radiated from the gamma ray source $c$ on the tomographic plane 9 which need not be examined and when its intensity (quantity of gamma rays radiated per unit time) is equal to the one at said points $a$, $b$, the gamma ray irradiating the detector from the point $c$ per unit time does not keep its position, but distributes widely on the detector surface and thus the image appearing on said display becomes much more vague and dark than those caused by said points on the plane 8. Thus, the distribution of the gamma ray source only on a particular tomographic plane 8 can be detected selectively and sharply without distortion. The gamma ray source distribution on the other parts produces only a very vague background fog.

Now, the conditions of moving the detector and the collimator by which the fixed points on said tomographic plane 8 are made to correspond one to one to the fixed points on the detector 4 by way of the collimator 1 so as to detect the gamma ray image with high resolution and good contrast will be described.

Figure 3:
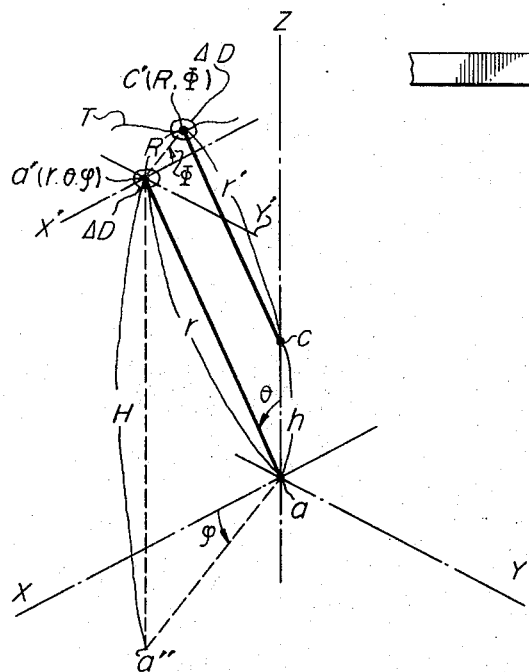

FIG. 3 is a solid diagram showing the relationship between the fixed points on the tomographic planes 8, 9 shown in FIG. 2 and the points on the gamma ray sensitive area on which said fixed points are projected as gamma ray image.

Letters X, Y and Z indicate the coordinates wherein an arbitrary fixed point $a$ on the tomographical plane X-Y to be examined is chosen as the origin. X'-Y' indicates the coordinates on the detector and coordinate axes X' and Y' are parallel respectively to X and Y axes of the X-Y-Z coordinate system. The origin $a'$ ($r$, $\theta$, $\phi$) is shown in a polar coordinate in which the fixed point $a$ on the X-Y plane is chosen as the origin. Letter $c$ indicates a fixed point on another tomographical plane not to be examined which is separated from said fixed point $a$ by a distance $h$ along the Z axis.

Further, "the direction of the center axis of each collimator hole is parallel to each other" as described hereinabove, "the gamma ray sensitive area (X'-Y' plane) of the detector makes a translation with respect to the tomographical plane (X-Y plane)," "the fixed point $a$ on the X-Y plane and the fixed point $a'$ on the X'-Y' plane are arranged to be seen from each other always by the adjustment of the collimator angle of the parallel hole collimator," and a point $c'$ on the X'-Y' plane which corresponds to the point $c$ on a tomographic plane other than said X-Y plane is denoted by $c'(R, \Phi)$.

Here, $c'(R, \Phi)$ is expressed in terms of the polar coordinates of the point $c$ in the X'-Y' plane. As is evident from FIG. 3, $$\Phi = \phi, \quad (1)$$

$$R = h \tan \theta, \quad (2)$$

where $\theta$ is the angle between the normal of said tomographic plane and the center axis of the collimator hole and this angle is referred to as the collimator angle. Letter $\phi$ indicates the angle between the projection $\overline{aa''}$ on the X-Y plane of the center axis $\overline{aa'}$ of the collimator hole and the X axis and this angle $\phi$ is referred to as the rotating angle of collimator. Accordingly, the point $c'$ on the detector which corresponds to the point $c$ on the tomographic plane which need not be examined moves in accordance with the time variation of said collimator angle $\theta$ and said rotating angle of collimator $\phi$. The trajectory is shown by $T = c'(\Phi, R)$.

For brevity of presentation, some assumptions which do not materially influence the following discussion will be made. Namely, the cross section of the gamma ray beam going from the fixed gamma ray source points $a$, $c$ on said tomographic plane towards the points $a'$, $c'$ after passing through the collimator hole which is cut by the detector is constant and of a circular form of diameter $\Delta D$ and further, the density of the gamma ray is uniform within said cross section.

Now, the change, contrast, etc. of the density of gamma rays (quantity of gamma rays per unit area) received by the detector when said moving point $c'$ moves on the detector will be investigated.

The length $dl$ of the movement of the point $c'$ on the detector during time interval $dt$ is expressed from said equations (1) and (2) as, $$dl^2 = dR^2 + (Rd\Phi)^2, \quad (3)$$

and the translation velocity $v$ of the point $c'$ relative to the detector plane is, $$v = dl/dt. \quad (4)$$

If the diameter of the cross section of the gamma ray beam cut by the detector is expressed as $\Delta D$ as described above, the area $ds$ which the gamma rays from the point $c'$ trace on the detector plane during time $dt$ is approximately $$ds = \Delta D v \cdot dt. \quad (5)$$

The ratio of the intensity of the gamma ray detected at said point $c'$ to the intensity $I_o$ of the gamma ray radiated at the incident point $c$, i.e. the detecting efficiency $\eta$, is written in the form, $$\eta = (\Delta D)^2/4^2 \pi r'^2 \cdot \eta = k^o(\Delta D)^2/r'^2, \quad (6)$$

where $\eta$ = quantum efficiency of detector
$r' = \overline{cc'}$
$K = \eta /4^2$ = constant.

Accordingly, the density of the gamma rays contributing to forming an image observed on the detector is shown as, $$(I_o \eta / \Delta D v) = (K I_o \Delta D / r'^2 v). \quad (7)$$

Therefore, when the trajectory of said moving point $c'$ does not cross with itself, the density of gamma rays on said trajectory is shown by the above equation (7) irrespective of the time of exposure needed to photograph with a camera. If said moving point $c'$ draws n closed curves during said time of exposure $T_M$ and the period thereof is called $T_p (= T_M/n)$, the density of gamma rays projected onto the detector is expressd by, $$(n I_o \eta / \Delta D \cdot v) = (T_M I_o \eta / T_p \Delta D v) = (T_M K I_o \Delta D / T_p r'^2 v) \quad (8)$$

On the other hand, the density of gamma rays at the point $a'$ on the detector corresponding to said point $a$ is expressed as, $$I_o \eta T_M / \pi /4 (\Delta D)^2 = 4 K I_o T_M / \pi r^2 \quad (9)$$

Accordingly, the ratios $\sigma$ and $\sigma'$ of the density of gamma rays at the moving point $c'$ which draws said closed curve or said open curve, respectively, to the density of gamma rays at said point $a'$ are expressed by the following formula, $$\sigma = \pi \Delta D / 4 T_p v, \quad (10)$$

$$\sigma' = \pi \Delta D / 4 T_M v, \quad (11)$$

where $r'$ is approximated to be equal to $r$. These ratios are equal to the ratio of the brightness of the images of the two gamma ray point sources of the same intensity located on a tomographic plane under detection and another, obtained on the detection plane. Accordingly, as these ratios become larger, better information of only the tomographic plane will be obtained.

Therefore, in order to suppress the image caused by the gamma ray source on tomographic planes not to be examined and appearing on said display (hereinafter the term "image" means the image appearing on the display) and to intensify the image caused by the gamma ray source on the plane to be examined as much as possible for better contrast, the translation velocity $v$ of said moving point $c'$ and/or the translation period $T_p$ need be increased as much as possible.

In a practical method of suppressing the image of the moving point $c'$ by satisfying said conditions, the distance R between the point $c'$ and the origin is made as large as possible considering the depth of focus.

This means that when the distance $h$ between the plane to be examined and the plane not to be examined is kept constant, said collimator angle $\theta$ must be made as large as possible (near 90°) as seen from eq. (2). Further, as seen from eqs. (3) and (4), when said distance R is made large, the translation velocity $v$ necessarily becomes large. Thus, it will be understood that a better image is obtained when the collimator angle $\theta$ is made larger.

If said moving point $c'$ is made not to move along the same path, the trajectory distributes faintly and widely over the detector and the image due to said trajectory becomes faint. Further, it is most preferable that the density of gamma rays of said moving point $c'$ is constant over the whole trajectory so as to erase unnecessary images. In this case, it is preferable that the relation, $$KI_o \cdot \Delta D/r'^2 v = \text{const.} , \tag{12}$$

holds as seen from eq. (7). The intensity of gamma ray $I_o$ can be taken as constant during the time of exposure $T_M$ and usually the diameter of the gamma ray beam $\Delta D$ can be considered as nearly constant. Thus, said equation becomes $$r'^2 v = \text{const.} \tag{13}$$

Now, when we consider the case where the distance $h$ between said two tomographic planes in FIG. 3 is small, i.e. $r = r'$, the relation $$r^2 v = \text{const.} \tag{14}$$

holds. Accordingly, if the motion of said collimator is controlled by said relation and the collimator angle is made as large as possible, it will certainly be possible to catch the information from the tomographic plane to be examined with high resolution and good contrast.

Now, this invention will be describe in more detail with reference to some preferred embodiments of the invention.

EMBODIMENT 1

Figure 4:
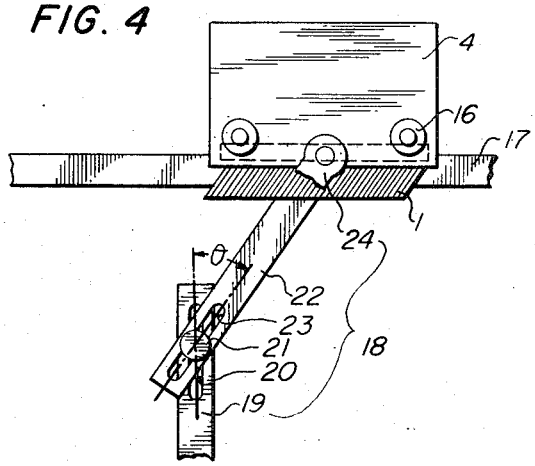
FIG. 4 is a side view of a first embodiment of this invention.

FIG. 4 shows a first embodiment of this invention which corresponds to a case where the rotating angle of collimator $\phi$ is made zero and the distance H between the tomographic plane to be examined and the detector is always made constant in FIG. 3. Namely, $$\phi = 0, \quad r \cos \theta = H \text{ (const.)}. \tag{15}$$

A gamma ray detector 4 in FIG. 4 is a large size NaI or T$l$ scintillator and such a detector can be formed by collecting small size NaI detectors. Other kind of detectors include one formed by arranging semi-conductor detectors in a plane form, one formed by arranging Geiger-Muller counters in a wide plane form.

Reference numeral 1 indicates a collimator provided in contact with a gamma ray detector of the kind described above. In this collimator, pipes 11 of a constant length made of a material like lead alloy, tungsten or the like which hardly transmit the gamma ray are maintained with a holder such as a side plate 12 and a base plate 13, and lubricant such as molybdate sulphide is added to the part where each of said pipes contacts the other pipes or the holder. Thereby, said pipes can be freely moved by applying pressures of mutually reverse direction to the top and bottom parts of said holder.

As another structure of the collimator 1 used in the device shown in FIG. 4, a structure in which a number of comb-like metal wafers 14 are arranged through the guide 15 and they are freely moved by applying pressures from the right and from the left as shown in FIG. 6 is advised. An example of said comb-like metal wafer 14 is shown in FIG. 7. Said metal wafer is made of a material such as lead alloy, tungsten, etc. through which gamma rays hardly penetrate and lubricant such as molybdate sulphide is added between said metal wafers in a way similar to the case of FIG. 5. Thus, as shown in FIGS. 4 to 7, the collimator is composed so that the center axes of the collimator holes can be freely deflected parallelly in various ways.

In FIG. 4, 16 indicates a wheel provided to the detector 4 in such a manner that the detector freely moves back and forth on the rail 17, which is fixed by metal fittings (not shown), to make a translation with respect to said tomographic plane. 18 indicates a cam or a link mechanism moving back and forth with said detector, and the vertical position of the fulcrum 21 can be freely changed within the range of the ditch 20 provided at the fixed bar 19. Said cam or link mechanism is composed so that when said detector performs a reciprocating motion, the collimator is rotated around said fulcrum 21 while gliding the lever supported in a rotation-free manner at an end on the detector 4. At the same time, the center axis of said collimator hole 2 may be automatically changed its direction by the guide 24 placed on the same plane as the one where the detector and/or scintillator is placed.

The design is made so that the direction of the center axis of the collimator hole 2 may always be parallel to the axis of the lever 22 and said fulcrum 21 is positioned at the same level with the "tomographic plane to be examined" which is parallel to said sensitive area. Thereby, said detector is moved on the rail 17 by a separate driving means not shown in the figure. Then, each point on the tomographic plane passing through said fulcrum can be made to correspond one to one to each one point on the detector irrespective of the motion of said detector, and said one to one correspondence condition is not satisfied for the point on the plane not passing through said fulcrum. Therefore, only the image corresponding to points on the plane to be examined is clearly detected as explained with reference to FIG. 2.

Now, some consideration will be given hereinbelow as to what image the gamma ray point source outside the tomographic plane makes. The image of a point separated from the tomographic plane by $h$ moves on the detector along with the motion of the detector. The translation distance $dl$ relative to the detector is expressed by the equation (3), $$dl^2 = dR^2 + (Rd\phi)^2.$$

In this embodiment, $$\phi = 0, \tag{15}$$

then, equation (3) becomes $$dl = dR.$$

On the other hand, from equation (2)

$$R = h \tan \theta. \tag{2}$$

when $dl$ is integrated in the interval $-Ⓑ < \theta < Ⓑ$, $$l = \int_{-Ⓑ}^{Ⓑ} dl = 2\int_0^Ⓑ dR = 2h \tan Ⓑ.$$

Namely, a straight line of $2h \tan \theta$ in length is obtained. Accordingly, all the points except those on the tomographic plane under examination form straight lines as shown by the above formula and these lines are drawn vaguely. As the vague line becomes longer, the image becomes darker as is evident from eq. (10) and it is preferable to make the images except those of the tomographic plane vague.

The conditions under which only the gamma rays radiated from the tomographic plane to be examined can be detected with high resolution and good contrast in this embodiment will be apparent from the following.

From the equation (15), $$r = H/\cos \theta.$$

When this is put into equation (14), $$r^2 v = (H/\cos \theta)^2 \, v = \text{const.}$$

$$v = K_1 \cos^2 \theta \; (K_1 = \text{const.}).$$

(16)

On the other hand, from eqs. (1) and (2),
$d\Phi = d\phi$
$R = h \tan \theta$
$dR = (h/\cos^2 \theta) \, d\theta.$
When these are put in equation (3), we obtain
$dl^2 = ((h/\cos^2 \theta) \, d\theta)^2 + (h \tan \theta)^2 \, d\phi^2.$
Since $\phi = 0$, the above equation becomes $$dl^2 = ((h/\cos^2 \theta) \, d\theta)^2$$

$$dl = \pm ((h/\cos^2 \theta) \, d\theta)$$

Accordingly, from equation (4), $$v = dl/dt = \pm (h/\cos^2 \theta) \, d\theta/dt,$$

(17)

and the following formula is obtained from equations (17) and (16).

$$d\theta/dt = K_2 \cos^4 \theta \; (K_2 = \text{const.})$$

(18)

Accordingly, if the lever 22 in FIG. 4 is made to perform a reciprocating motion in such a way that the angular velocity of the collimator angle $\theta$ becomes proportional to $\cos^4 \theta$, the gamma ray source on the plane to be examined can be detected with high resolution and good contrast. Naturally, even if the relationship of the above formula (18) is not satisfied, tomographic detection is feasible, and the main object of this invention described hereinabove can be achieved.

EMBODIMENT 2

FIGS. 8 and 9 show embodiments in which the collimator and the detector are moved simultaneously while keeping the "distance r between points on the tomographical plane to be detected and corresponding points on the detector" and "the collimator angle $\theta$" shown in FIG. 3 constant.

FIG. 8 is a plan diagram viewed from the tomographical plane side towards the collimator side and FIG. 9 shows a longitudinal sectional diagram along IX—IX' line of FIG. 8.

In these two figures, numeral 1 indicates a collimator made of a material through which gamma rays hardly penetrate. The collimator includes a large number of collimator holes 2 the center axes of which are parallel with each other and make a constant angle $\theta$ with respect to the normal of the collimator. Accordingly, the collimator angle $\theta$ does not change with translation. Said collimator is set to a base plate 32 by an outer frame 30 with bolt-nuts 31. The bolt-nuts 31 are inserted into the ditch formed in parallel with the straight line IX-IX' of the base plate 32 and the collimator may be set after changing the relative position with respect to the base plate within the range of the ditch. Accordingly, the gap $d$ between the center line $Z_1 Z'_1$ of the base plate and the center line $Z_2 Z'_2$ of the detector 4 positioned coaxially with the collimator can easily be changed.

The collimator 1 is formed so that the center lines of the collimator hole 2 become parallel to the cross section IX—IX'.

Said base plate 32 can be rotated about the center axis $Z_1 Z'_1$ thereof with the collimator and the detector. Further, the detector 4 is arranged to perform a rotation about the center axis $Z_2 Z'_2$ with respect to the base plate 32 during the rotation of the base plate 32.

Accordingly, in this device, each of said axes are driven so that the detector makes one rotation with respect to the base plate in a reverse sense while the base plate and the collimator makes one revolution and one rotation, respectively.

By setting in this way, the detector does not perform any rotation but only translation with respect to the tomographical plane to be examined 8 though the base plate does rotate.

As shown in the drawings, it is required that the tomographical plane 8 to be examined includes the cross point of said rotation axis $Z_1 Z'_1$ and the center axis of a collimator hole passing through the rotation center 0' of the detector and it forms a plane parallel to the detector 4.

It will be easily understood that the distance between the tomographical plane and the detector can be changed by varying the gap d between said rotation axis $Z_1 Z'_1$ and the rotation axis $Z_2 Z'_2$.

Figure 10:
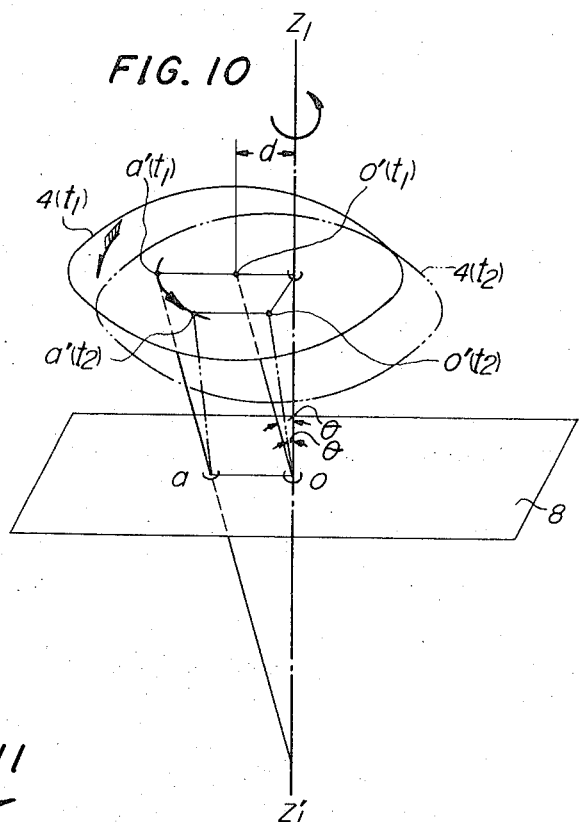
FIG. 10 is diagram for explaining the principle of the second embodiment of this invention.

Now, the operation of the second embodiment of this invention will be described with reference to FIG. 10.

Now, let the detector positioned at $4(t_1)$ at time $t_1$ move to $4(t_2)$ at time $t_2$ after the translation along the circular trajectory as described hereinabove and let the point 0' which is seen from the cross point 0 between the tomographical plane 8 and the rotation axis $Z_1 Z'_1$ of the base plate through a collimator hole move from $0'(t_1)$ to $0'(t_2)$. As is evident from the foregoing description about the positioning of said tomographical plane, the point 0' which is seen from the point 0 through a collimator hole is the rotation center of the detector with respect to the base plate and is fixed with respect to the detector irrespective of the motion.

Now, let the position of a point on the detector which is seen from another fixed point a on said tomographical plane through a collimator hole be $a'(t_1)$ at time $t_1$ and $a'(t_2)$ at time $t_2$.

Since all the center axes of the collimator holes are parallel, $\overline{00'(t_1)} \, // \, \overline{aa'(t_1)}$. Further, sithe detector 4 and the tomographical plane are always parallel, it is evident that $\overline{0'(t_1)a'(t_1)} \, // \, \overline{0a}$. Similarly, it is evident that $\overline{OO'(t_2)} \parallel \overline{aa'(t_2)}$ and $\overline{O'(t_2)a'(t_2)} \parallel \overline{Oa}$. From these relations, it is readily understood that $$\overline{Oa} = \overline{O'(t_1)a'(t_1)} = \overline{O'(t_2)a'(t_2)}$$
$$\overline{Oa} \parallel \overline{O'(t_1)a'(t_1)} \parallel \overline{O'(t_2)a'(t_2)}.$$

Here, the point $0'$ on the detector which is seen from the point $0$ through a collimator hole or which corresponds to the point $0$ is fixed to the detector. Since the detector does not rotate, but performs only translation without rotation, it is easily understood that the above equation means that the point $a'$ is fixed to the detector throughout a detection and the relative position of the point $a'$ with respect to the point $0'$ is equal to the relative position of the point $a$ with respect to the point $0$ on the tomographical plane.

Thus, the gamma ray distribution on the tomographical plane is projected irrespective of the motion of the detector and the projection is fixed on the detector without motion. Accordingly, if the gamma ray distribution on the detector is displayed by a display in a manner similar to that of the conventional scintillation camera, the gamma ray distribution on the tomographical plane can be observed sharply. It is also understood that the image formed by the gamma ray point sources placed outside of the tomographical plane draw a circular trajectory of radius $h \tan \theta$ as described in connection with Embodiment 1. The brightness of the image becomes darker as the radius increases and this is preferable to make the image of the point outside the tomographical plane vague.

Now the conditions for observing the gamma ray from a tomographical plane to be observed with high resolution and good contrast in this embodiment will be considered.

Firstly, since the collimator angle $\theta$ is constant, $$\Phi = \phi$$

$$R = h \tan \theta = \text{const},$$

from the former equations (1) and (2).
Accordingly, a point on the detector corresponding to a point on a tomographical plane separated from the tomographical plane to be examined performs a circular motion ($dR = 0$). Thus, from equation (3), $$dl = h \tan \theta \, d\phi, \quad (19)$$

and $$v = dl/dt = \pm h \tan \theta \, d\phi/dt. \quad (20)$$

If the above equation (19) and the condition $r = \text{const.}$ are applied to equation (14), $$d\phi/dt = \text{const.} \quad (21)$$

Therefore, an image of high resolution and good contrast can be obtained if the collimator is made to perform a uniform circular motion.

EMBODIMENT 3

Figure 11:
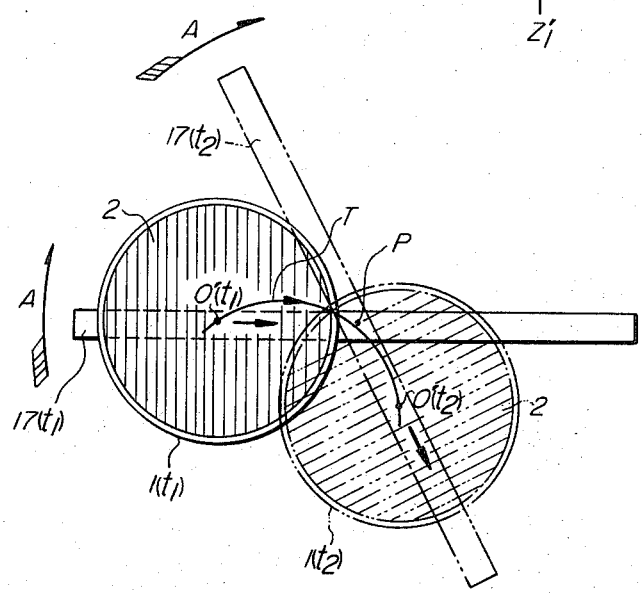
FIG. 11 is a diagram shown in plan view for explaining the principle of the third embodiment of this invention.

The embodiment shown in FIG. 11 has a structure combining said embodiment 1 (FIG. 4), wherein the collimator performs a reciprocating motion and at the same time the center axes of collimator holes are deflected in combination with said reciprocating motion, and said embodiment 2 (FIGS. 8 through 10), wherein the detector is made to perform a circular translation with respect to a tomographical plane while the collimator is rotated.

Figure 5:
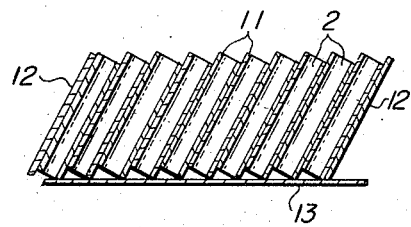

As shown in the plan diagram of FIG. 11, in which the collimator is viewed from the object side, the multihole type collimator 1 as shown in FIG. 5 or 6 the collimator holes of which are arranged in parallel in a certain direction and are freely deflectable is made to perform a reciprocating motion on the rail 17, and said rail is rotated about the middle point P in a direction indicated by the arrow A and at the same time the direction of the center axes of the collimator holes 2 is made to be deflected continuously as shown in FIG. 4. Further, the detector placed on the collimator is made to perform translation without rotation in accordance with the movement of said collimator (the trajectory of the center is shown by T).

When the fulcrum 21 as shown in FIG. 4 is placed at a position including the tomographical plane to be examined in such a structure that points on said tomographical plane are made to correspond one to one to points on the detector in the same way as described hereinabove, then it becomes possible to observe the distribution of gamma ray sources on said tomographical plane.

If the rotation period of said rail and the period of the reciprocation of the collimator moving on the rail are suitably changed, it becomes possible to disperse gamma rays from a tomographical plane which is not to be observed. Further, if each of said periods is chosen so that it is not an integral multiple of the other, gamma rays from a tomographical plane not to be observed do not draw the same trajectory repeatedly. Therefore, the image caused by said gamma rays is not observed sharply.

As has been described in detail hereinabove, the radioisotope camera according to this invention is a device, wherein a collimator, in which the center axes of the collimator holes are parallel to each other, are provided in contact with the object side of the gamma ray detector, said detector is made to perform a translation without rotation with respect to the tomographical plane of the object and at the same time the collimator and/or collimator holes are moved and/or deflected simultaneously so that the points on the tomographical plane may always correspond one to one to the points on the detector. This device has the following characteristics over the conventional ones:

1. Since points on the detector always correspond one to one to points on the tomographical plane to be examined by way of the collimator and does not correspond one to one to any other tomographical plane, tomography becomes possible. When this invention is applied to the scintillation camera, high resolution tomographical diagnosis becomes possible because it has a sensitivity about ten times larger than that of the conventional scintillation scanner. Thus, this invention has a large merit from the viewpoint of medical examination.

2. As will be understood from the theory deriving the equation (14), contrast becomes better and resolution of the tomographical plane becomes higher as the collimator angle $\theta$ is increased. In order to enhance the effect further, it is generally most effective to follow equation (14). Further, it is the most effective method to operate the collimator in accordance with equation

(18) as to the first embodiment and equation (21) as to the second embodiment for achieving said effect.

3. Since it is not necessary to employ a structure wherein the direction of collimator holes is changed in said second embodiment wherein the collimator is rotated and revolved and at the same time the detector is translated in combination therewith, the fabrication of the collimator becomes quite simple. Further, it becomes unnecessary to provide a complicated mechanism whereby the direction of the collimator holes is changed in accordance with the translation of the collimator and it is advantageous from an economic point of view.

4. In the third embodiment composed by combining the first and second embodiments, though the structure becomes a little complicated, even a gamma ray source separated from the tomographical plane by a very small distance produces an extremely vague and dark image and a tomographical image having a very small depth of focus can be obtained.

Since a tomographical image can be obtained relatively easily by the radioisotope camera, the positional information about a diseased part becomes more accurate. Further since the contribution of the background gamma ray distrubtion in the human body to the image decreases, a relatively small gamma ray concentration can be easily detected. Thus, it becomes possible to increase the value of the camera for diagnosis remarkably.

The technical thought of the radioisotope camera of this invention is not restricted to the embodiments described hereinabove.

This invention can be applied equally well to the other kind of radioisotope cameras consisting of a multi-hole collimator provided on the object side of a gamma ray detector and comprising collimator holes whose center axes are parallel to each other, and a display device which can display the distribution of the gamma ray source in the object by the signal generated in said gamma ray detector. The scope of this invention includes such devices.

For example, there is a method in which scintillation light emitted by the bombardment of a gamma ray is received by a photocathode, the photoelectrons produced by the process is intensified by an image intensifier and focused into an image on a fluorescent screen of the image intensifier and said image is photographed with a camera or received with an image orthicon and a television set.

Further, there is an autofluoroscope (or Bender type scintillation camera), in which small independent scintillators are arranged in a mosaic form and the light emitted by the bombardment of the gamma ray is photographed with a camera.

As another example which uses scintillators, there is a device in which a thin metal cathode made of silver or aluminum is used as a detector, a space is made by said cathode and Nesa glass, said space is filled with rare gas like Xenon, Argon, etc. and a high voltage is applied between said cathode and said Nesa glass. In such a device, an electric spark is generated partially at said space using the recoil electrons generated from the cathode by the bombardment of gamma rays and the spark light is photographed with an image intensifier or a camera.

There are various other examples and they are described in detail in Gerald J. Hine, "Instrumentation in Nuclear Machine," Academic Press, New York 1967, pp. 486 – 552, in particular in A – I on pp. 487 – 495.

Since this invention can be applied equally well to these radioisotope cameras, the technique of this invention is a promising further development in the field of medical diagnosis using isotopes.

What is claimed is:

1. A radioisotope camera having a structure consisting of a gamma ray detector having a detecting surface, a multi-hole collimator provided in the vicinity of the detecting surface of said gamma ray detector and having collimator holes the center axes of which are parallel to each other, and a device capable of displaying the distribution of gamma ray sources in a object by using the signal generated by said gamma ray detector, said camera comprising first means for causing translation motion of said detector without rotation and second means for moving the disposition of said collimator holes in connection with the translation of said detector whereby points on a predetermined tomographical plane parallel to the detecting surface can correspond one to one to points on said detecting surface by way of said collimator holes.

2. A radioisotope camera having a structure consisting of a gamma ray detector having a detecting surface, a multi-hole collimator provided in the vicinity of the detecting surface of said gamma ray detector and having collimator holes the center axes of which are parallel to each other, and a device capable of displaying the distribution of gamma ray sources in an object by using the signal generated by said gamma ray detector; the direction of the axes of said collimator and the collimator holes being freely changed, said camera comprising first means for translating said detector without rotation and second means for moving or deflecting the collimator or collimator angle or moving and deflecting both simultaneously whereby points on a predetermined tomographical plane parallel to said detecting surface are made to correspond one to one to points on said detecting surface by way of said collimator holes.

3. A radioisotope camera having a structure consisting of a gamma ray detector having a detecting surface, a multi-hole collimator provided in the vicinity of the detecting surface of said gamma ray detector and having collimator holes the center axes of which are parallel to each other, and a device capable of displaying the distribution of gamma ray sources in an object by using the signal generated by said gamma ray detector, said camera comprising first means for causing circular motion of said detector without rotation and second means for revolving said collimator having collimator holes of a constant inclination in synchronization with said detector as well as for causing circular motion of the same, whereby points on a predetermined tomographical plane are made to correspond one to one to points on the detecting surface by way of said collimator holes.

4. A radioisotope camera having a structure consisting of a gamma ray detector having a detecting surface, a multi-hole collimator provided in the vicinity of the detecting surface of said gamma ray detector and having collimator holes the center axes of which are parallel to each other, and a device capable of displaying the distribution of gamma ray sources in an object by using the signal generated by said gamma ray detector, said camera comprising first means for translating said detector without rotation, second means for reciprocating and rotating said collimator and third means for changing the axial direction of said collimator holes in combination with the motion of said collimator whereby points on a predetermined tomographical plane are made to correspond one to one to points on the detecting surface by way of said collimator holes.

5. In a device for imaging the volume distribution of radionuclides throughout an object under investigation, in combination:
   a radiation detector, including a substantially planar radiation sensitive transducer, of the type producing an output representing plane position coordinates of each quantum of radiation impinging on said transducer;
   radiation shielding means interposed between said transducer and said object defining a substantially uniform radiation acceptance direction for each elemental area of said transducer; and
   driving means operatively associated with said radiation detector and said radiation shielding means for changing the position of said radiation detector with respect to said object and said radiation acceptance direction defined by said radiation shielding means with respect to said transducer in a synchronous manner to produce predetermined patterned movement of images generated on said transducer by quanta of radiation emanating from radionuclides in elemental volumes of said object, said predetermined patterned movement differing in accordance with the volume position coordinates of each said elemental volume such that the output from said radiation detector may be translated into useful information concerning the distribution of radionuclides across a plane through said object at any selected distance from said transducer.

6. The combination as claimed in claim 5, wherein said radiation shielding means comprises a collimator of substantially radiation opaque material defining an array of mutually spaced apertures, each of said apertures having a common non-normal axial orientation with respect to said transducer; said collimator being rotatably mounted adjacent said transducer; said driving means comprising means operative to produce a precession of said detector in a circle of preselected radius and a rotation of said collimator in synchronism such that said predetermined patterned movement of each image is substantially circular, the center of each said circular movement corresponding to the plane position coordinates of its associated elemental volume and the radius of said circular movement being a predetermined function of the separation distance between said associated elemental volume and said transducer, said axial orientation of said apertures and said preselected radius of said circular precession.

7. Apparatus for imaging an object having a three dimensional distribution of radionuclides therethroughout, comprising:
   a radiation detector including a radiation sensitive transducer having a two dimensional radiation detecting capability and output means associated with said transducer operative to produce visible elemental output signals corresponding in time and relative spatial displacement to the position of impingement of a quantum of radiation on said transducer;
   a multichannel radiation collimator rotatably mounted in a position adjacent said transducer, the axis of each channel of said collimator having substantially the same non-normal angular orientation with respect to said transducer;
   driving means operatively associated with said detector and said collimator for moving said detector in a circular precession of a selected radius over said object and for rotating said collimator in a synchronous relation to said detector, whereby said output signals from said detector provide an in-focus image of the distribution of radionuclides across a particular plane through said object depending upon said angular orientation and said selected radius.

* * * * *